United States Patent
Ökvist et al.

(10) Patent No.: US 12,549,685 B2
(45) Date of Patent: Feb. 10, 2026

(54) EXTENDED REALITY SERVERS PREFORMING ACTIONS DIRECTED TO VIRTUAL OBJECTS BASED ON OVERLAPPING FIELD OF VIEWS OF PARTICIPANTS

(71) Applicant: Telefonaktiebolaget LM Ericsson (publ), Stockholm (SE)

(72) Inventors: Peter Ökvist, Luleå (SE); Tommy Arngren, Södra Sunderbyn (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 146 days.

(21) Appl. No.: 18/287,662

(22) PCT Filed: Apr. 21, 2021

(86) PCT No.: PCT/EP2021/060444
§ 371 (c)(1),
(2) Date: Oct. 20, 2023

(87) PCT Pub. No.: WO2022/223113
PCT Pub. Date: Oct. 27, 2022

(65) Prior Publication Data
US 2024/0205370 A1  Jun. 20, 2024

(51) Int. Cl.
*G06T 7/00* (2017.01)
*G06T 7/20* (2017.01)
(Continued)

(52) U.S. Cl.
CPC .............. *H04N 7/157* (2013.01); *G06T 7/20* (2013.01); *G06T 19/20* (2013.01); *H04N 7/152* (2013.01);
(Continued)

(58) Field of Classification Search
None
See application file for complete search history.

(56) References Cited

U.S. PATENT DOCUMENTS

2009/0100035 A1  4/2009  Cradick et al.
2010/0070884 A1  3/2010  Bromenshenkel et al.
(Continued)

OTHER PUBLICATIONS

International Search Report and Written Opinion of the International Searching Authority, PCT/EP2021/060444, mailed Feb. 8, 2022, 10 pages.
(Continued)

*Primary Examiner* — Martin Mushambo
(74) *Attorney, Agent, or Firm* — Sage Patent Group

(57) ABSTRACT

An XR environment server is configured to represent an immersive XR environment on a display device viewable by a participant among a group of participants who have associated avatars representing the participants and which are rendered for viewing in the immersive XR environment. The XR environment server is further configured to determine direction of a FOV of the participant from a perspective of a location of the associated avatar in the immersive XR environment relative to a coordinate system of the immersive virtual environment. Based on the direction of the FOV of the participant, the XR environment server is further configured to identify a virtual object that is rendered for display at a location in the immersive XR environment which is within the FOV of the participant.

22 Claims, 9 Drawing Sheets

(51) Int. Cl.
*G06T 19/20* (2011.01)
*H04N 7/15* (2006.01)

(52) U.S. Cl.
CPC ............... *G06T 2219/2004* (2013.01); *G06T 2219/2012* (2013.01); *G06T 2219/2016* (2013.01); *G06T 2219/2021* (2013.01)

(56) References Cited

U.S. PATENT DOCUMENTS

| | | |
|---|---|---|
| 2010/0121810 A1 | 5/2010 | Bromenshenkel et al. |
| 2010/0122182 A1 | 5/2010 | Bromenshenkel et al. |
| 2011/0029897 A1 | 2/2011 | Russell |
| 2018/0247453 A1 | 8/2018 | Nakashima et al. |
| 2020/0066049 A1 | 2/2020 | Sun et al. |
| 2020/0349768 A1* | 11/2020 | Zavesky ............... G06T 19/006 |
| 2021/0336784 A1* | 10/2021 | Athlur ................. H04L 63/0442 |

OTHER PUBLICATIONS

Red Bull Editorial Team, "10 best multiplayer VR grames that money can buy," published Jul. 1, 2010, downloaded on Apr. 22, 2021 from: https://www.redbull.com/us-en/best-multiplayer-vr-games, 22 pages.

Wikipedia, "Foveated rendering," downloaded on Apr. 22, 2021 from: https://en.wikipedia.org/wiki/Foveated_rendering, 3 pages.

pokemon.com, "Pokémon GO," downloaded on Apr. 22, 2021 from: https://www.pokemon.com/se/app/pokemon-go/, 25 pages (includes English translation).

Xr4work, "The 10 best VR meeting apps—productive remote collaboration," published Apr. 7, 2020, downloaded on Apr. 22, 2021 from: https://www.xr4work.com/articles/best-vr-apps-productive-remote-meetings, 11 pages.

Tobii, Website, accessed on the Internet on Oct. 14, 2023 at: https://www.tobii.com, 8 pages.

Spatial, Website, accessed on the Internet on Oct. 14, 2023 at: https://www.spatial.io/, 10 pages.

Harry Potter Wiki, Website, accessed on the Internet on Oct. 14, 2023 at: https://harrypotter.fandom.com/wiki/Magical_transportation#Portkey, 8 pages.

* cited by examiner

EXTENDED REALITY SERVERS PREFORMING ACTIONS DIRECTED TO VIRTUAL OBJECTS BASED ON OVERLAPPING FIELD OF VIEWS OF PARTICIPANTS

TECHNICAL FIELD

The present disclosure relates to rendering extended reality (XR) environments and associated XR servers and XR participant devices, and related operations for acting on virtual objects rendered in immersive XR environments.

BACKGROUND

Immersive extended reality (XR) environments have been developed which provide a myriad of different types of user experiences for gaming, on-line meetings, co-creation of products, etc. XR environments include virtual reality (VR) environments where human participants only see computer generated graphical renderings and include augmented reality (AR) environments where participants see a combination of computer-generated graphical renderings overlaid on a view of the physical real-world through, e.g., see-through display screens.

Example software products that provide XR environments include Meetin VR, Glue, FrameVR, Engage, Big-Screen VR, Rumii, Mozilla Hubs, AltSpace, Rec Room, Spatial, and Immersed. Example user devices that can display XR environments to participants include Oculus Quest VR headset, Oculus Go VR headset, and personal computers and smart phones running various VR applications.

Immersive XR environments are often configured to display computer generated avatars which represent locations of human participants in the immersive XR environments. A participant may select and customize an avatar to represent that person for viewing by other participants in the immersive XR environment. In the physical real-world, people are adept at understanding another person's field of view (FOV) direction, also referred to as gazing direction, by watching the other person's body posture, face direction, and/or eye fovea directions. However, in an XR environment where human participants are represented by avatars it can be difficult for a participant to understanding other participants' FOVs because, for example, the faces and eyes of avatars may not be computer rendered or may be statically oriented relative to a rendered torso of the avatar and not be animated to track movement of a participant's eyes and/or head relative to a coordinate system of an XR environment.

Eye tracking technologies exist for tracking where a user who is wearing an XR headset is looking within an XR environment. For example, foveated rendering is a rendering technique which uses an eye tracker integrated with an XR headset to reduce the computer workload for rendering an XR environment by reducing the image quality in the wearer's peripheral vision (outside of the zone gazed by the fovea). A less sophisticated variant called fixed foveated rendering does not utilize eye tracking and instead assumes a fixed focal point of the wearer within the XR environment. Tobii AB makes eye tracking products for use in XR headsets and other applications.

SUMMARY

Some embodiments disclosed herein are directed to an XR environment server that includes at least one processor and at least one memory storing instructions executable by the at least one processor to perform operations. The operations represent an immersive XR environment on a display device viewable by a participant among a group of participants who have associated avatars representing the participants and which are rendered for viewing in the immersive XR environment. The operations determine direction of a FOV of the participant from a perspective of a location of the associated avatar in the immersive XR environment relative to a coordinate system of the immersive virtual environment. Based on the direction of the FOV of the participant, the operations identify a virtual object that is rendered for display at a location in the immersive XR environment which is within the FOV of the participant. Based on when a measurement of the FOV with respect to the virtual object satisfies a virtual object action rule, the operations perform a defined action directed to the virtual object.

Some other related embodiments are directed to a corresponding method by an XR environment server. The method represents an immersive XR environment on a display device viewable by a participant among a group of participants who have associated avatars representing the participants and which are rendered for viewing in the immersive XR environment. The method determines direction of a FOV of the participant from a perspective of a location of the associated avatar in the immersive XR environment relative to a coordinate system of the immersive virtual environment. Based on the direction of the FOV of the participant, the method identifies a virtual object that is rendered for display at a location in the immersive XR environment which is within the FOV of the participant. Based on when a measurement of the FOV with respect to the virtual object satisfies a virtual object action rule, the method performs a defined action directed to the virtual object.

Some other related embodiments are directed to a corresponding computer program product including a non-transitory computer readable medium storing program code executable by at least one processor of an XR environment server to perform operations. The operations represent an immersive XR environment on a display device viewable by a participant among a group of participants who have associated avatars representing the participants and which are rendered for viewing in the immersive XR environment. The operations determine direction of a FOV of the participant from a perspective of a location of the associated avatar in the immersive XR environment relative to a coordinate system of the immersive virtual environment. Based on the direction of the FOV of the participant, the operations identify a virtual object that is rendered for display at a location in the immersive XR environment which is within the FOV of the participant. Based on when a measurement of the FOV with respect to the virtual object satisfies a virtual object action rule, the operations perform a defined action directed to the virtual object.

Some embodiments disclosed herein are directed to an XR environment server configured to represent an immersive XR environment on a display device viewable by a participant among a group of participants who have associated avatars representing the participants and which are rendered for viewing in the immersive XR environment. The XR environment server is further configured to determine direction of a FOV of the participant from a perspective of a location of the associated avatar in the immersive XR environment relative to a coordinate system of the immersive virtual environment. Based on the direction of the FOV of the participant, the XR environment server is further configured to identify a virtual object that is rendered for display at a location in the immersive XR environment which is within the FOV of the participant. Based on when a measurement of the FOV with respect to the virtual object satisfies a virtual object action rule, the XR environment server is further configured to perform a defined action directed to the virtual object.

Some potential advantages of these embodiments are that they enable human participants to intuitively interact with virtual objects in the immersive XR environment. For example, participants can intuitively use their FOV to trigger actions directed to one or more virtual objects which are rendered in an immersive XR environment. As will be explained in more detail below, a participant may stare at a virtual object for a threshold FOV hold time and/or maintain a threshold FOV hold stability relative to a virtual object in a manner that satisfies a virtual object action rule to cause a defined action to be performed directed to the virtual object. A condition for satisfying the virtual object action rule may be based on having overlapping FOVs of a plural number of participants which overlap a rendered location of the virtual object within the XR environment, to cause a defined action to be performed directed to the virtual object. During a virtual on-line meeting, meeting participants may select a participant who is desired or expected to speak during the on-line meeting by naturally looking at an avatar associated with that participant to, when an associated virtual object action rule is satisfied, enable or cause streaming of video and/or audio from a device of the presenter to other participants in the virtual on-line meeting, and/or cause the presenter's avatar to be moved to a designated presenter location in the immersive XR environment so that other participants can view the presenter's avatar and/or view visual content provided by the presenter.

Other XR environment servers, methods, and computer program products according to embodiments will be or become apparent to one with skill in the art upon review of the following drawings and detailed description. It is intended that all such additional XR environment servers, methods, and computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Figure 1:
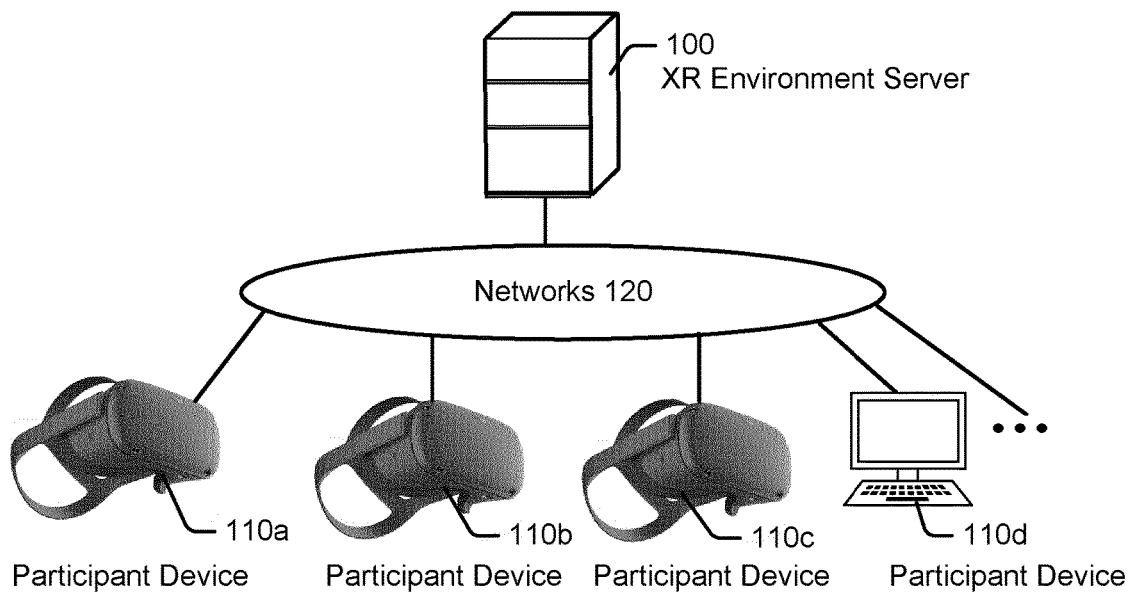
FIG. 1 illustrates an XR system that includes a plurality of participant devices that communicate through networks with an XR environment server to operate in accordance with some embodiments of the present disclosure.

FIG. 1 illustrates an XR system that includes a plurality of participant devices 110a-d that communicate through networks 120 with an XR environment server 100 to operate in accordance with some embodiments of the present disclosure. The XR environment server 100 is configured to generate a graphical representation of an immersive XR environment which is viewable from various perspectives of virtual locations of human participants in that environment through display screens of the various participant devices 110a-d. For example, the illustrated devices include VR headsets 110a-c which can be worn by participants to view and navigate through the XR environment, and a personal computer 100d which can be operated by a participant to view and navigate through the XR environment.

Although the XR environment server 100 is illustrated in FIG. 1 and elsewhere as being separate from one or more of the participant devices, in some other embodiments the XR environment server 100 is implemented as a component of one or more of the participant devices. For example, one of the participant devices may be configured to perform operations of the XR environment server in a centralized manner for other ones of the participant devices. Alternatively, each of the participant devices may be configured to perform at least some of the operations of the XR environment server in a distributed decentralized manner with coordination communications being performed between the distributed XR environment servers (e.g., software operational instances of XR environment servers) for some operations, such as determining overlap between the respective FOVs of the devices in the XR environment and determining when a virtual object action rules become satisfied and performing responsive actions.

Figure 2:
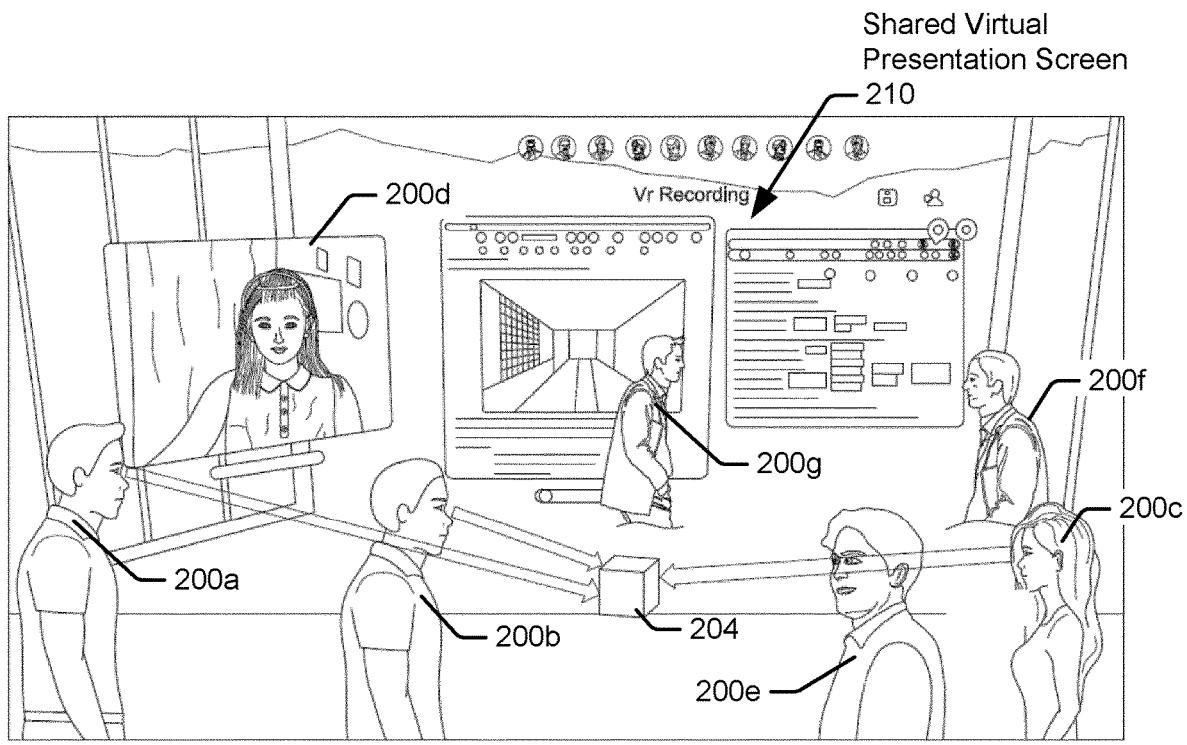
FIG. 2 illustrates an immersive XR environment with participants' avatars and a shared virtual presentation screen that are rendered at various locations within the XR environment, in accordance with some embodiments of the present disclosure.

FIG. 2 illustrates an immersive XR environment with avatars 200a-f that are graphically rendered at locations and with orientations representing the present field of views (FOVs) of associated human participants in the XR environment. In the illustrated example, streaming video from a camera of the participant device 110d (personal computer) is displayed in a virtual screen 200d instead of rendering an avatar to represent the participant. A shared virtual presentation screen 210 is also graphically rendered at a location within the XR environment and can display pictures and/or video that are being presented for viewing by the participants in the XR environment. A virtual object 204 is graphically rendered in the XR environment. The virtual object 204 may be graphically rendered in the XR environment with any shape or size, and can represent a virtual object (e.g., table, chair, object on table, door, window, virtual television or computer, virtual appliance, animated vehicle, animated animal, etc.), or a human participant in the XR environment (e.g., an avatar representation of a human participant) and may be animated to track movement and pose of the human participant within the XR environment responsive to movement input from the human participant and output of an eye-tracking device and/or head-tracking device.

Figure 3:
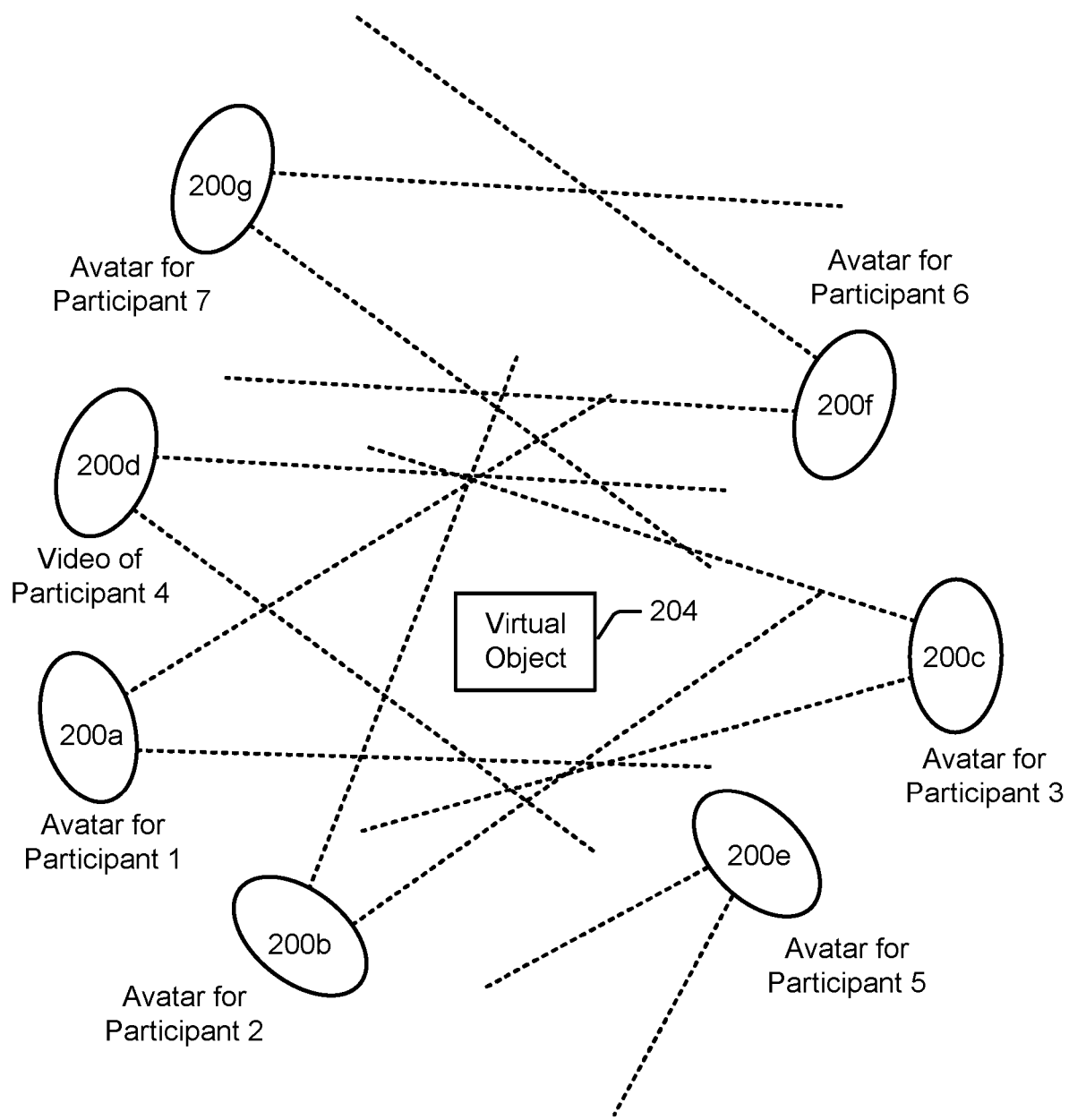
FIG. 3 illustrates overlapping FOVs of some participants in the immersive XR environment shown in FIG. 2 which satisfies a virtual object action rule to perform a defined action directed to a virtual object within the overlapping FOVs, in accordance with some embodiments of the present disclosure.
Figure 4:
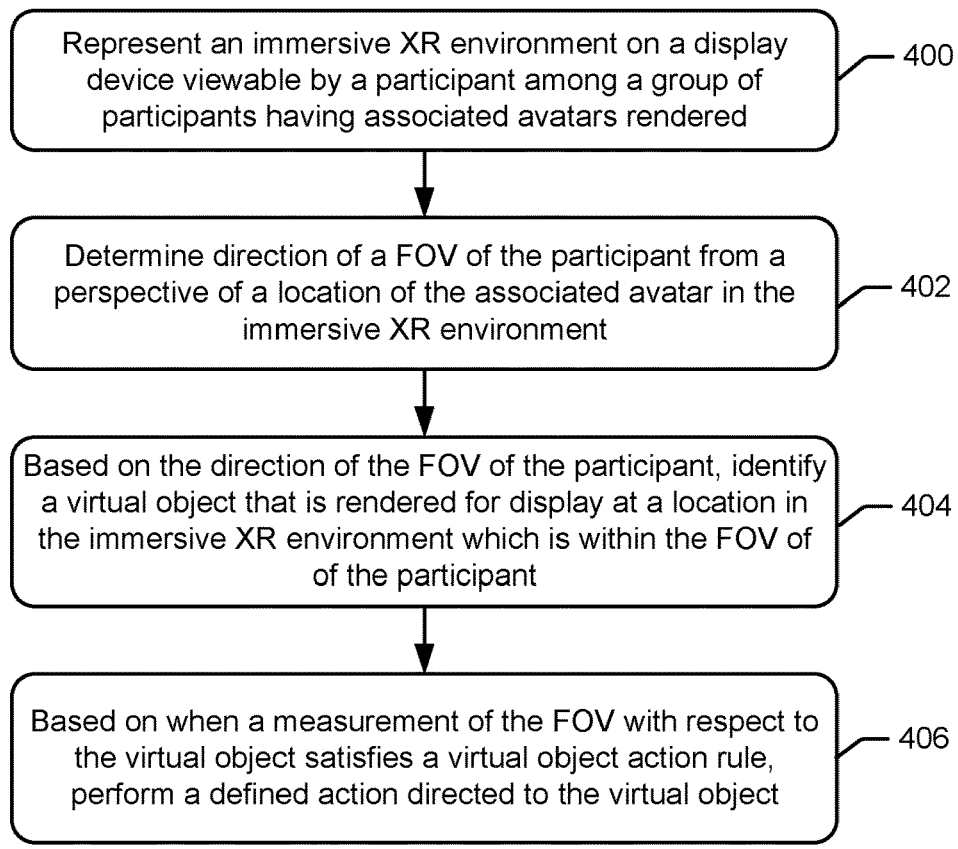
FIGS. 4 and 5 are flowcharts of operations that can be performed by the XR environment server of FIG. 1 in accordance with some embodiments of the present disclosure.
Figure 5:
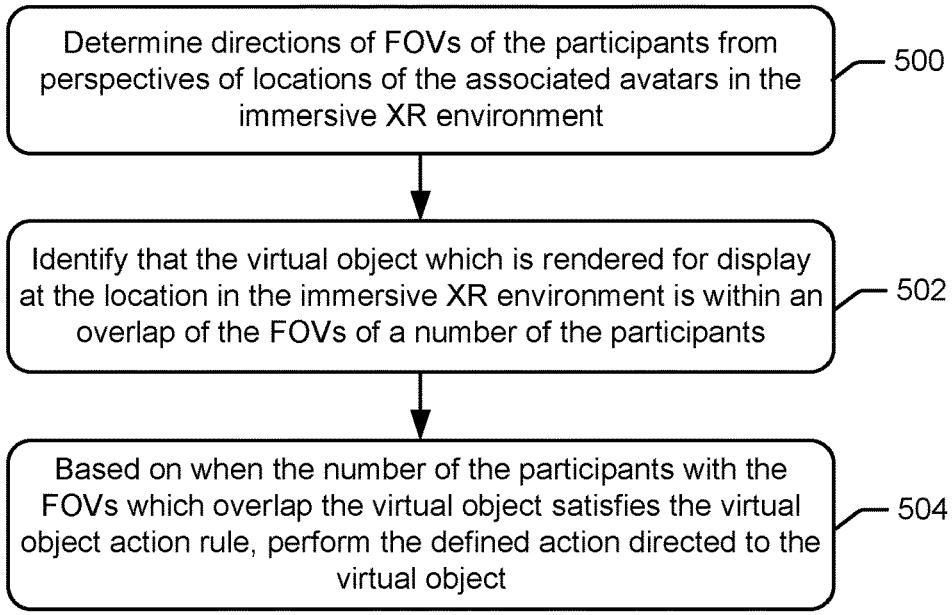

FIG. 3 illustrates overlapping FOVs, which are represented as areas between sets of dashed lines extending from avatars represented as ovals, of some participants in the immersive XR environment shown in FIG. 2. In an operational embodiment, the overlapping FOVs satisfies a virtual object action rule to perform a defined action directed to a virtual object 204 which is rendered at a location that is within the overlapping FOVs. FIGS. 4 and 5 are flowcharts of operations that can be performed by the XR environment server of FIG. 1 in accordance with some embodiments of the present disclosure.

For a participant who is wearing an XR headset, the participant's FOV at a location of the participant's avatar within the immersive XR environment relative to a coordinate system can be determined using various known technical, such a visual camera and inertial sensor simultaneous localization and mapping by Oculus Quest type XR headsets. For another participant who using a non-XR headset, such as a smartphone, tablet computer, or desktop computer to interface with the immersive XR environment, the participant's FOV at a location of the participant's avatar relative to the coordinate system can be determined using a camera facing the participant (e.g., a front-facing camera adjacent to a display device) that tracks the participant's head pose, eye pose, etc.

Referring to FIGS. 2, 3, and 4, the XR environment server 100 is configured to represent 400 an immersive XR environment (such as shown in FIG. 2) on a display device that is viewable by a participant (e.g., wearing XR headset device 110a) among a group of participants (e.g., using devices 110b-d and so-on of FIG. 1) who have associated avatars 200a-f in FIG. 2 representing the participants rendered for viewing in the immersive XR environment, also referred to as "XR environment," using devices 110a-d and so-on in FIG. 1.

The XR environment server 100 determines 402 direction of a FOV of the participant from a perspective of a location of the associated avatar (e.g., 200a) in the immersive XR environment relative to a coordinate system of the immersive virtual environment. The participant's FOV can be determined based on a location and pose of the rendered associated avatar within the XR environment, and may be further be determined based on use of an eye-tracking device which tracks the participant's eyes viewing direction relative to the participant's view of the displayed rendering of the XR environment and/or be determined based on use of a head-tracking device which tracks the participant's head direction (e.g., while wearing an XR headset) relative to the participant's view of the displayed rendering of the XR environment.

Based on the direction of the FOV of the participant, the XR environment server 100 can be configured to identify 404 that the virtual object 204, which is rendered for display at a location in the immersive XR environment, is within the FOV of the participant (e.g., participant's avatar 200a). In the example shown in FIGS. 2 and 3, the virtual object 204 can be determined to be rendered at a location that is within the overlapping FOVs of the participants associated with avatars 200a, 200b, 200c, and 200d.

Based on when a measurement of the FOV with respect to the virtual object 204 satisfies a virtual object action rule, XR environment server 100 can be configured to perform 406 a defined action directed to the virtual object 204. For example, a participant associated with avatar 200a can trigger an action to performed directed to the virtual object 204 by, for example, maintaining a FOV hold time with respect to the virtual object 204 and/or maintaining a FOV hold stability with respect to the virtual object 204.

Regarding FOV hold time, an operation to determine when the measurement of the FOV with respect to the virtual object 204 satisfies the virtual object action rule, can include determining a FOV hold time that the participant (e.g., associated with avatar 200a) has maintained the FOV within a threshold angular range of the location of the virtual object 204, and determining that the virtual object action rule is satisfied based on the FOV hold time satisfying a hold time threshold number.

Regarding FOV hold stability, an operation to determine when the measurement of the FOV with respect to the virtual object 204 satisfies the virtual object action rule, can include measuring a FOV hold stability value indicating an amount of angular movement occurring between a center of the FOV of the participant (e.g., associated with avatar 200a) from the location of the virtual object 204 during a defined duration, and determining that the virtual object action rule is satisfied based on the FOV hold stability value satisfying a FOV hold stability threshold number.

In some embodiments, the ability to perform an action directed to the virtual object 204 can be restricted to whether the participant has a defined privilege and/or a define role that satisfies a virtual object access rule. In some embodiment, an operation to determine when the measurement of the FOV with respect to the virtual object satisfies the virtual object action rule, includes determining whether the virtual object access rule is satisfied based on at least one of: determining whether the participant has a defined privilege (e.g., granted privilege to modify all or defined ones of the virtual objects in the XR environment) that satisfies the virtual object access rule for being allowed to perform an action directed to the virtual object; and determining whether the participant has a defined role in the immersive XR environment (e.g., meeting organizer or meeting presenter) that satisfies the virtual object access rule for being allowed to perform an action directed to the virtual object.

In some embodiments, the ability to perform an action directed to the virtual object 204 can be restricted to whether the participant is located in a defined virtual room, which may be the same or different from where the virtual object 204 is located within the XR environment.

Example actions are now described which can be performed when the measurement of the FOV with respect to the virtual object 204 satisfies a virtual object action rule. These example actions are described in the context of FIG. 10 which illustrates a flowchart of operations that can be performed by the XR environment server in some embodiments.

Figure 10:
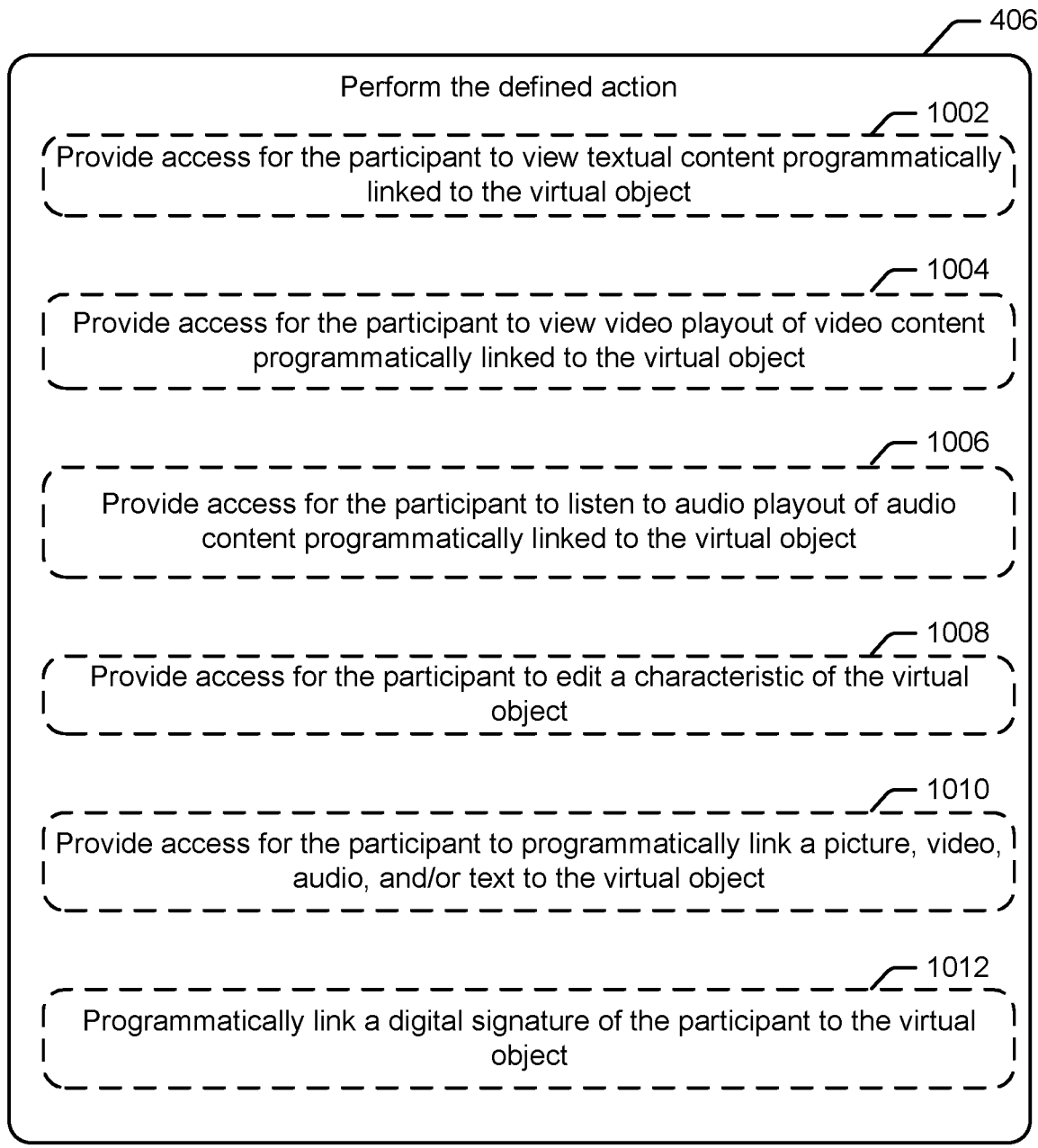

Referring to FIG. 10, based on when the measurement of the FOV with respect to the virtual object 204 satisfies a virtual object action rule, the operation to perform 406 the defined action directed to the virtual object 204 includes at least one of: providing (1002) access for the participant to view and/or print textual content programmatically linked to the virtual object 204; providing (1004) access for the participant to view video playout of video content programmatically linked to the virtual object 204; providing (1006) access for the participant to listen to audio playout of audio content programmatically linked to the virtual object 204; providing (1008) access for the participant to edit a characteristic of the virtual object 204; providing (1010) access for the participant to programmatically link, view, and/or print a picture, video, audio, and/or text to the virtual object 204; and programmatically linking (1012) a digital signature of the participant to the virtual object 204. Accordingly, the action performed 406 may be any one or more of the operations 1002-1012. When more than one of the operations 1002-1012 is performed the operations may be performed in another order than what is illustrated or may be performed concurrently. For example, the action performed 406 may include operation 1010 to provide access for the participant to programmatically link video to the virtual object followed by or concurrently with operation 1008 to provide access for the participant to edit a characteristic of the virtual object.

Another operational actions that can be triggered based on when the measurement of the FOV with respect to the virtual object 204 satisfies the virtual object action rule, can include any one or more of: controlling movement of another virtual object (e.g., vacuum cleaner, lawn mower, printer) that is programmatically linked to the virtual object 204.

The example action of providing (1002) access for the participant to view textual content programmatically linked to the virtual object 204, may include displaying on the participant's device a textual description of the virtual object, status of further condition(s) that need to be further satisfied to perform one or more defined further actions, such as an indication of how many more participants and/or a listing of particular participants' names who need to also concurrently view the virtual object to trigger a defined further action(s).

The example action of providing (1004) access for the participant to view video playout of video content programmatically linked to the virtual object 204, may include streaming content of a video file which is associated with virtual object 204 to the participant's device.

The example action of providing (1006) access for the participant to listen to audio playout of audio content programmatically linked to the virtual object 204, may include streaming content of an audio file which is associated with the virtual object 204 to the participant's device.

The example action of providing (1008) access for the participant to edit a characteristic of the virtual object 204, may include enabling the participant to edit the shape, color, size, and/or rendered location within the XR environment, textual content programmatically linked to the virtual object 204, video content programmatically linked to the virtual object 204, and/or audio content programmatically linked to the virtual object 204.

Some other example actions are now described which can be performed when the measurement of the FOV with respect to the virtual object 204 satisfies a virtual object action rule. The action may control a physical object that is communicatively connected to the XR environment server. For example, the XR environment server may respond to a determination that the virtual object action rule is satisfied by communicating through a wired and/or wireless network with a physical object to perform an action (e.g., turn on/off, control movement, control an operational mode, etc.) by the physical object. These example actions are described in the context of FIG. 11 which illustrates a flowchart of operations that can be performed by the XR environment server in some embodiments.

Figure 11:
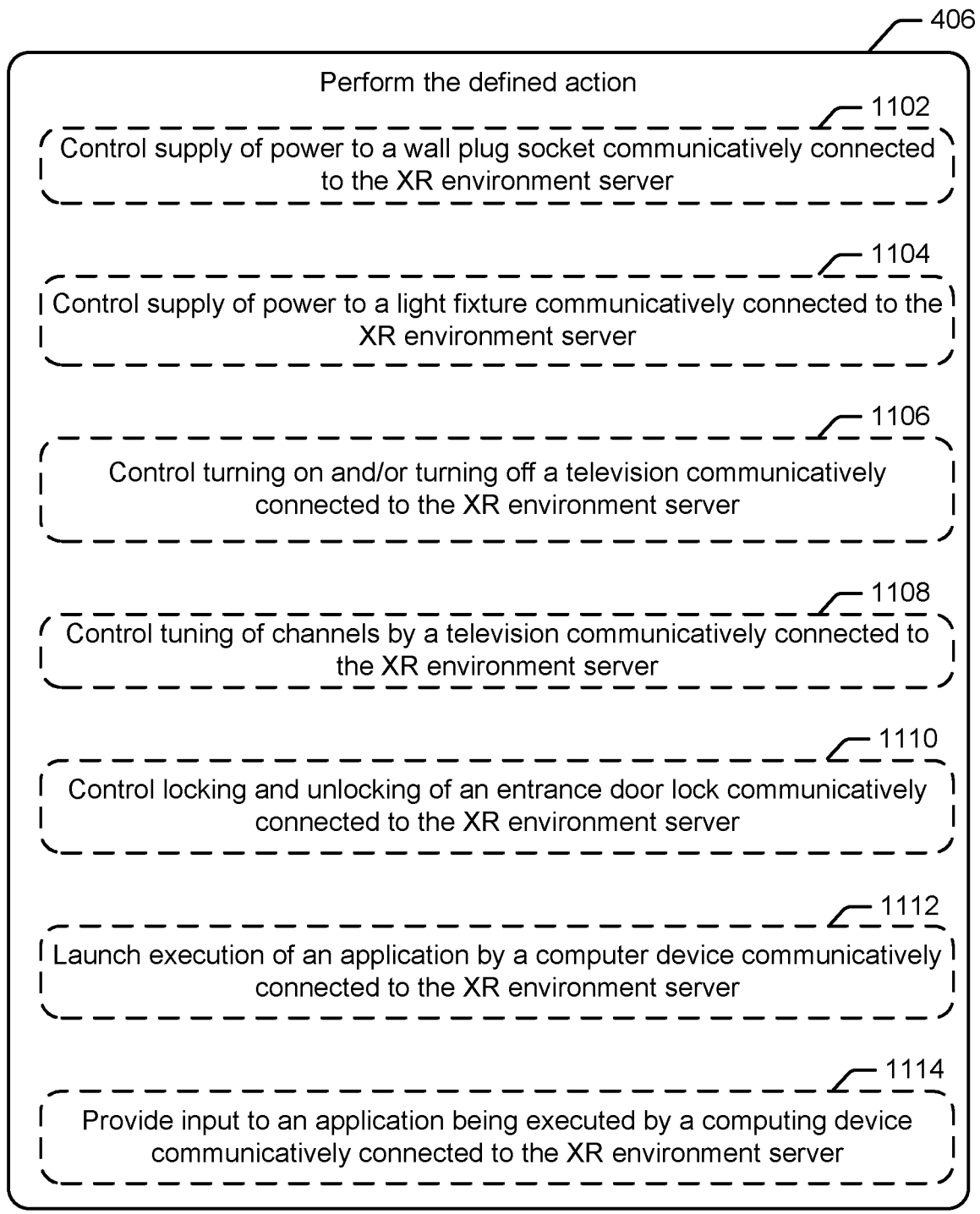

Referring to FIG. 11, based on when the measurement of the FOV with respect to the virtual object 204 satisfies a virtual object action rule, the operation to perform 406 the defined action directed to the virtual object 204 includes at least one of: controlling 1102 supply of power to a physical wall plug socket communicatively connected to the XR environment server; controlling 1104 supply of power to a physical light fixture communicatively connected to the XR environment server; controlling 1106 turning on and/or turning off a physical television communicatively connected to the XR environment server; controlling 1108 tuning of channels by a physical television communicatively connected to the XR environment server; controlling 1110 locking and unlocking of an entrance physical door lock communicatively connected to the XR environment server; launching 1112 execution of an application by a physical computer device communicatively connected to the XR environment server; and providing 1114 input to an application being executed by a physical computing device communicatively connected to the XR environment server. Accordingly, the action performed 406 may be any one or more of the operations 1102-1114. When more than one of the operations 1102-1114 is performed the operations may be performed in another order than what is illustrated or may be performed concurrently. For example, the action performed 406 may include operation 1112 to launch execution of an application by a computer device followed by or concurrently with operation 1106 to turn on a television.

Some other actions that can be performed are explained. Satisfying a virtual object action rule can unlock or enable participant(s) to access predefined, hidden, and/or random virtual objects present in the digital meeting room and within the FOV of a single participant or the FOVs a threshold number of participants. Another action can movement(s) of an avatar such as to another room or location with the XR environment. Another action can, for a desired virtual object, look-and-lock and then move the virtual object to new position in the XR environment (e.g., stare at a chair for a threshold time and then look elsewhere to reposition the chair). Another action can be triggered by a defined plurality of participants concurrently staring a virtual object for a threshold time to select and then cooperatively move the virtual object tracking movements of their respective FOVs while maintaining focus on the virtual object. Another action can trigger feedback from the XR environment server to a participant by haptics, sound, visual or combinations thereof to indicate when a virtual object action rule has been satisfied and/or to indicate what condition(s) still need to be met for the virtual object action rule to become satisfied, as will be explained in more detail below.

Although some embodiments have been described in the context of where a virtual object action rule is satisfied based on measurement of the FOV of a single participant in the XR environment, some other embodiments are directed to a condition for satisfying the virtual object action rule being based on having overlapping FOVs of a plural number of participants which overlap a rendered location of the virtual object 204 within the XR environment.

For example, in the example shown in FIGS. 2 and 3, the XR environment server can determine that the virtual object 204 is located within the overlapping FOVs of four participants associated with avatars 200*a*, 200*b*, 200*c*, and 200*d*. The XR environment server may further determine that having four participants concurrently viewing the virtual object 204 satisfies the virtual object action rule, and responsively perform a defined action directed to the virtual object 204.

These embodiments are now described in the context of the flowchart of FIG. 5, which illustrates operations that can be performed by the XR environment server to trigger an action based on overlapping FOVs in accordance with some embodiment.

Referring to FIGS. 3 and 5, the XR environment server is configured to determine 500 directions of FOVs of the participants from perspectives of locations of the associated avatars 200*a-g* in the immersive XR environment relative to the coordinate system of the immersive virtual environment. Based on the directions of the FOVs of the participants, the XR environment server identifies 502 that the virtual object 204 which is rendered for display at the location in the immersive XR environment is within an overlap of the FOVs of a number of the participants. Based on when the number of the participants with the FOVs which overlap the virtual object 204 satisfies the virtual object action rule, the XR environment server performs 504 the defined action directed to the virtual object 204.

In some embodiments, the virtual object action rule is satisfied based on at least a threshold number of the participants currently viewing the virtual object 204 by, for example, each maintaining a FOV hold time with respect to the virtual object 204 and/or maintaining a FOV hold stability with respect to the virtual object 204.

Regarding FOV hold time, operations to determine when the number of the participants with the FOVs that overlap satisfies the virtual object action rule may be performed as follows. For each of the number of the participants with the FOVs that overlap, the operations determine a FOV hold time that the participant has maintained the FOV within a threshold angular range of the location of the virtual object 204. The operations determine that the virtual object action rule is satisfied based on the number of the participants with the FOVs that overlap satisfying a group size threshold number and based on the FOV hold time satisfying a hold time threshold number for the participants with the FOVs that overlap.

Regarding FOV hold stability, operations to determine when the number of the participants with the FOVs that overlap satisfies the virtual object action rule may be performed as follows. For each of the number of the participants with the FOVs that overlap, the operations measure a FOV hold stability value indicating an amount of angular movement occurring between a center of the FOV of the participant from the location of the virtual object 204 during a defined duration. The operations determine that the virtual object action rule is satisfied based on the number of the participants with the FOVs that overlap satisfying a group size threshold number and based on the FOV hold stability value satisfying a FOV hold stability threshold number for the participants with the FOVs that overlap.

A condition for satisfying the virtual object action rule can be varied based on how quickly participants can move or are moving through locations in the XR environment, and/or based on how quickly participants can angularly scan their respective FOVs about in the XR environment. For example, the operations may set the hold time threshold number and/or the FOV hold stability threshold number to be less based on a fewer number of participants being present and set the hold time threshold number and/or the FOV hold stability threshold number to be greater based on a greater number of participants being present, or vice-versa. Also for example, the operations may set the hold time threshold number and/or the FOV hold stability threshold number to be less based on faster angular rate FOV movements being measured or operationally capable of being performed by the participants in the XR environment, and conversely set the hold time threshold number and/or the FOV hold stability threshold number to be greater based on slower angular rate FOV movements being measured or operationally capable of being performed by the participants in the XR environment, or vice-versa.

A condition for satisfying the virtual object action rule can be varied based on how many participants are present in the XR environment. In one embodiment, the operations to determine when the number of the participants with the FOVs that overlap satisfies the virtual object action rule, can include setting a threshold number defined by the virtual object action rule based on a total number of participants who are present in the immersive XR environment. The operations to determine when the number of the participants with the FOVs that overlap satisfies the virtual object action rule includes comparing the threshold number to the number of the participants with the FOVs that overlap. The operations then set the threshold number defined by the virtual object action rule based on an indication of how quickly the avatars associated with the group of participants are moving within the immersive XR environment. For example, the operations may set the threshold number to be lesser based on fewer participants being present and conversely set the threshold number to be greater based on more participants being present, or vice-versa.

Figure 6:
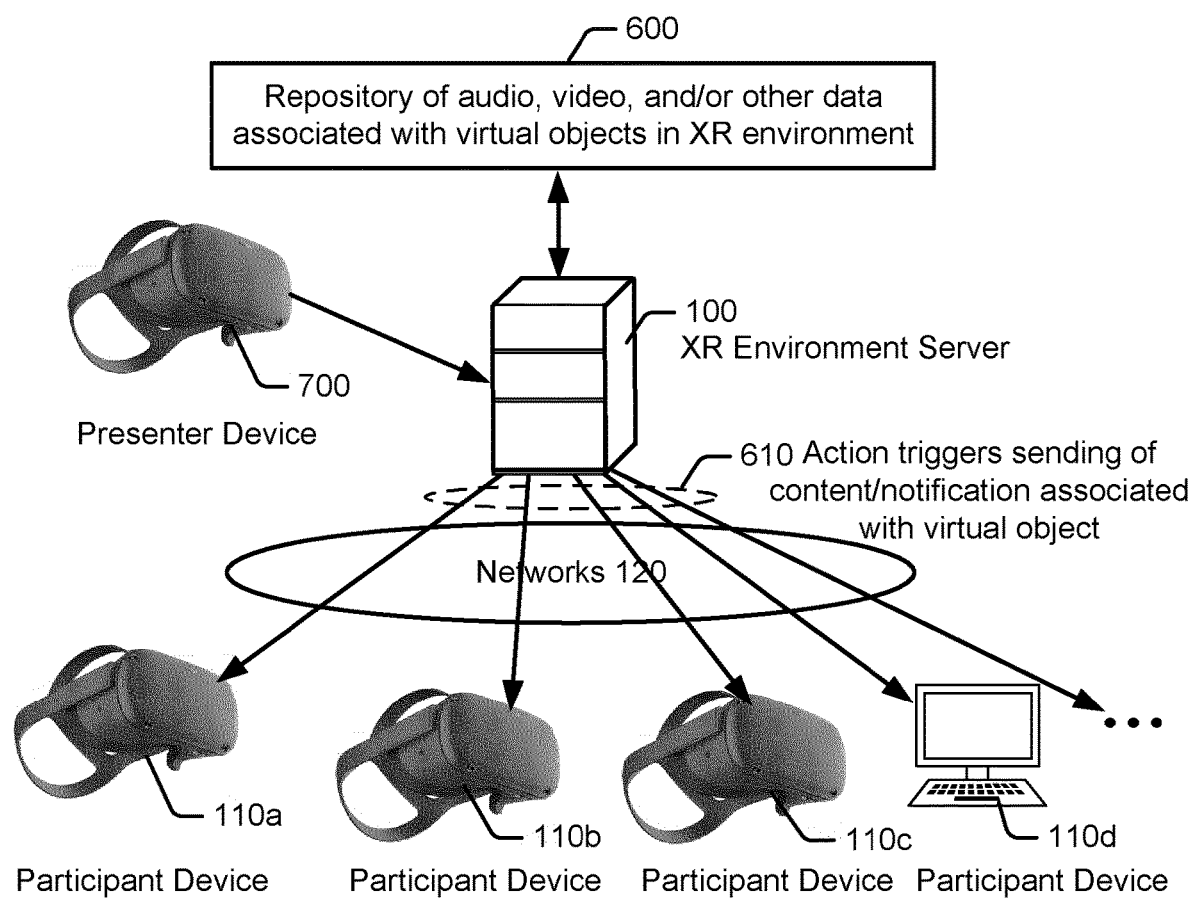
FIG. 6 illustrates the XR system of FIG. 1 which is configured to respond to a virtual object action rule becoming satisfied based on participants' FOVs overlapping a virtual object by performing an action that triggers sending of content and/or notifications associated with the virtual object in accordance with some embodiments of the present disclosure.

Some actions that can be performed based on a virtual object action rule becoming satisfied based on a group of participants having FOVs that overlap a virtual object are now explained in the context of FIG. 6, which illustrates the XR system of FIG. 1 configured to respond to a virtual object action rule becoming satisfied based on the overlapping participants' FOVs.

Referring to FIG. 6, when the number of the participants with FOVs that overlap satisfies the virtual object action rule, the operation to perform (504 in FIG. 5) the defined action directed to the virtual object can include at least one of: trigger playout of an audio stream, which is programmatically linked to the virtual object, to the participants with the FOVs that overlap; trigger playout of a video stream, which is programmatically linked to the virtual object, to the participants with the FOVs that overlap; and trigger generation of haptic feedback and/or other notification, which is programmatically linked to the virtual object, to the participants with the FOVs that overlap.

In the example of FIG. 6, the system includes a repository 600 of audio files, video files, and/or other data (e.g., textual descriptions) which is programmatically associated with virtual objects rendered in the XR environment. The XR environment server 100 is configured to respond to a virtual object action rule becoming satisfied for one of the virtual objects by sending content from the repository 600 which is associated with that virtual object, e.g., audio, video, and/or other data such as a textual description, to at least the participant devices which have the FOVs that overlap the virtual object satisfying the virtual object action rule. Alternatively or additionally, the XR environment server 100 may respond to the virtual object action rule being satisfied by streaming content from a presenter device 700, e.g., share screen of or other content from presenter device 700, to the participant devices. For example, participants operating devices 100*a-d* in FIG. 3 have overlapping FOVs that cover a virtual object, the XR environment server 100 may stream video and/or audio to the devices 100*a-d*.

With further reference to FIG. 5, in another example scenario, the operations track a first participant who approaches and maintains the virtual object 204 in the FOV. The operations determine that the FOV, FOV hold time, and/or FOV hold stability value satisfy a virtual object action rule, which can trigger other participants to be notified via visual, audible, and/or haptic feedback of that determination. When a threshold number of participants have FOVs that overlap the virtual object 204 satisfies an action rule associated with the virtual object 204, the participants trigger an action that includes one or more of the following: allowing the virtual object 204 to be repositioned within the XR environment based on input from the participants (e.g., virtual object 204 moved in a manner that tracks FOV movements of the participants); provide access to further information associated to with the virtual object 204; provide access to one, selected, or all participants that have the virtual object 204 in their FOV; provide via visual, audible, and/or haptic feedback to one, selected, or all participants that have the virtual object 204 in their FOV via haptics; activate access to selected or pre-determined content (start simultaneously) for one, selected, or all participants that have the virtual object 204 in their FOV; access a defined task or part associated with the virtual object 204; allow editing, printing or manipulating of a defined digital object (text, draw, record, etc.); allow access to and/or management of defined task rights (e.g. unlock) to other virtual objects which are defined in the same or associated class and/or to a predefined list of virtual objects.

When a virtual object action rule is not yet satisfied, the operations may provide notification to participant(s) who are viewing the object 204 and/or to all local participants as to what condition(s) still need to be completed in order to satisfy the virtual object action rule. For example, the notification may identify how many more participants need to view the object 204 and/or identify particular persons who need to also view the object 204 in order to satisfy the virtual object action rule. In one embodiment, the operations display an indication that the virtual object action rule for the virtual object is not satisfied, for view by the participants with the FOVs that overlap. In another embodiment, the operations display an indication of how many other participants need to join the participants with overlapping FOVs of the virtual object in order for the virtual object action rule to become satisfied. In another embodiment, the operations display an indication of a particular person's name who needs to join the participants with overlapping FOVs of the virtual object in order for the virtual object action rule to become satisfied.

Some other embodiments are directed to actions that are performed during group meetings, such as during on-line collaborative meetings involving presentations by one or more presenters. These and other related embodiments are described in the context of FIGS. 7-9.

Figure 7:
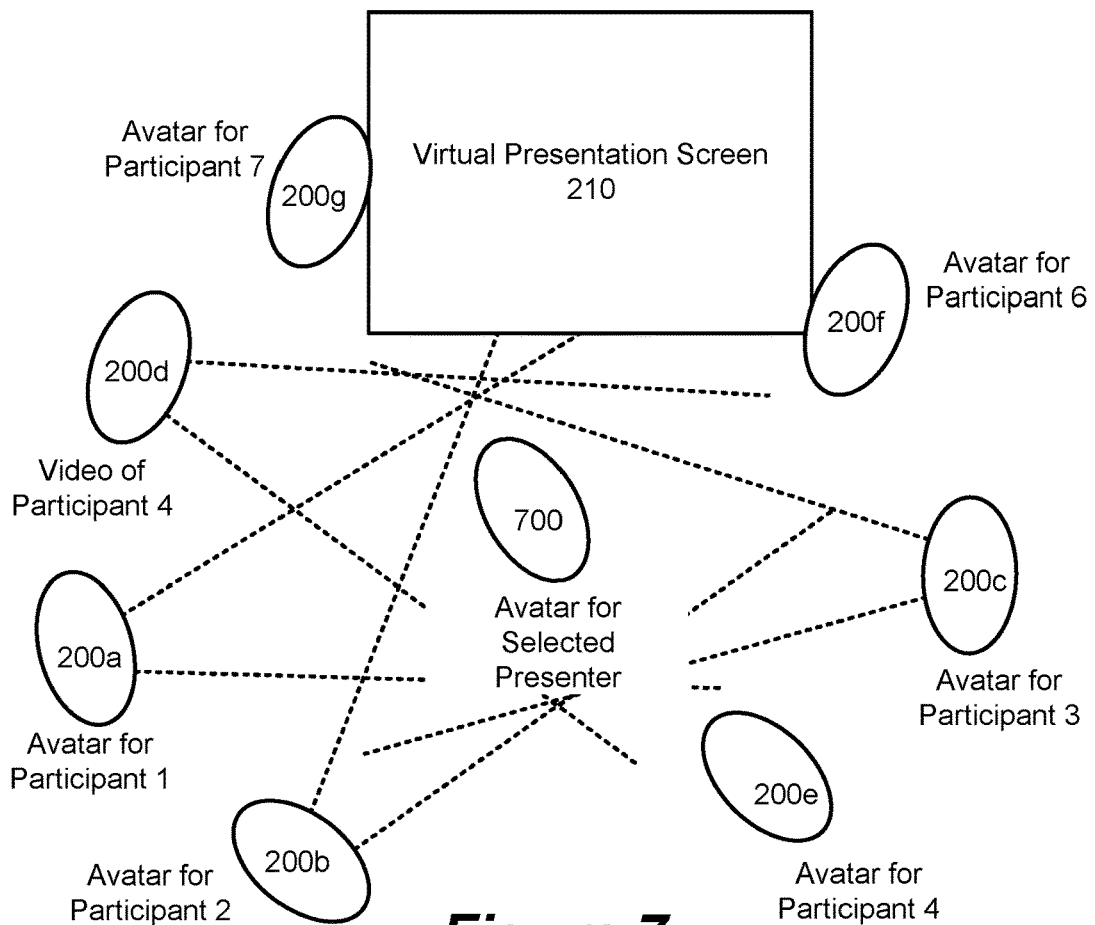
FIG. 7 illustrates overlapping FOVs of some participants in the immersive XR environment which triggers an action of selecting a participant's avatar located in the overlap to become a presenter who shares content with other participants, in accordance with some embodiments of the present disclosure.

FIG. 7 illustrates overlapping FOVs of some participants in the immersive XR environment which triggers an action of selecting a participant's avatar located in the overlap to become a presenter who shares content with other participants, in accordance with some embodiments of the present disclosure. FIGS. 8-11 are flowcharts of operations that can be performed by the XR environment server 100 of FIG. 1 in accordance with some embodiments of the present disclosure.

Referring to FIG. 7, in the illustrated example the virtual object corresponds to an avatar 700 for one of the participants. Participants in a virtual on-line meeting can dynamically designate who is to become a presenter or who is to join a group of presenters, by looking at the avatar of the person who they want to become a presenter. In the illustrated example, the XR environment server 100 determines that the avatars 200*a-d* corresponding to participants 1-4 have FOVs that overlap avatar 700 in a manner that satisfies a virtual object action rule which designates the participant associated with avatar 700 as a presenter in the on-line meeting.

Figure 8A:
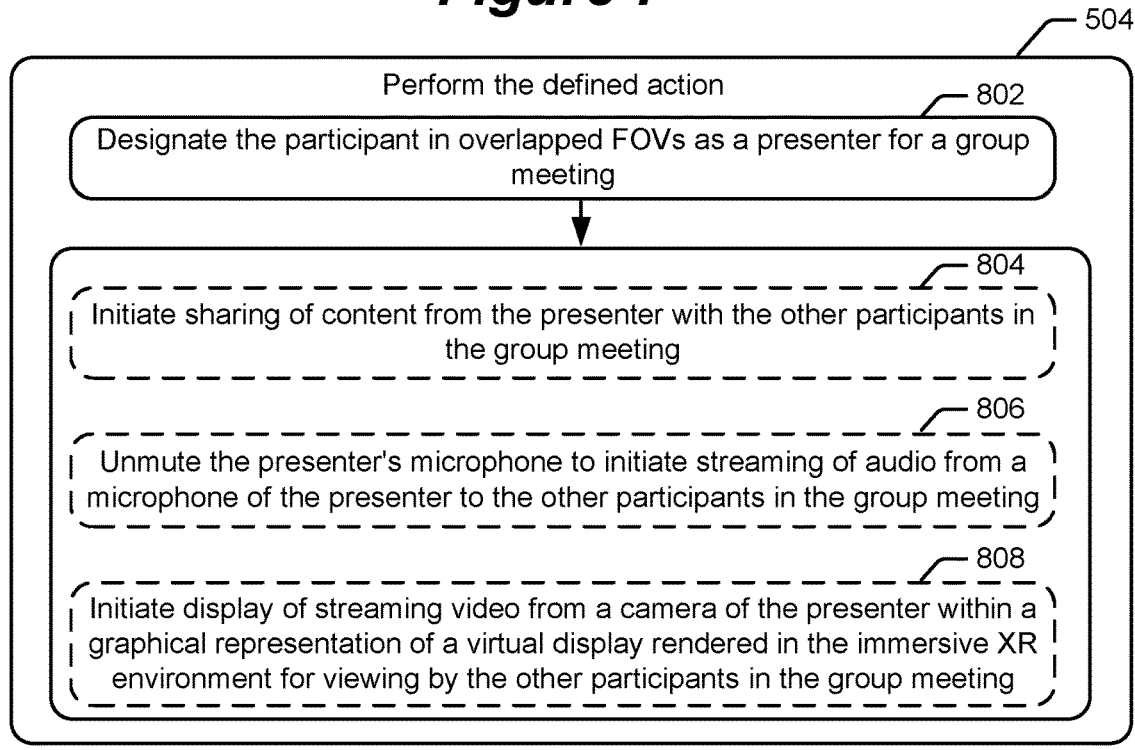
FIGS. 8-11 are flowcharts of operations that can be performed by the XR environment server of FIG. 1 in accordance with some embodiments of the present disclosure.
Figure 8B:
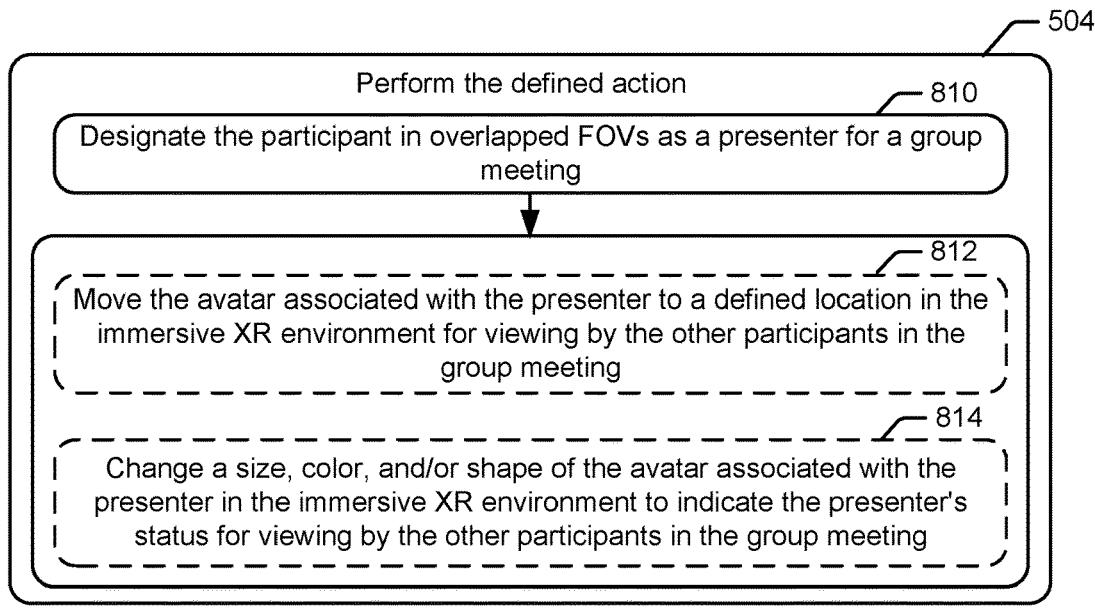
Figure 9:
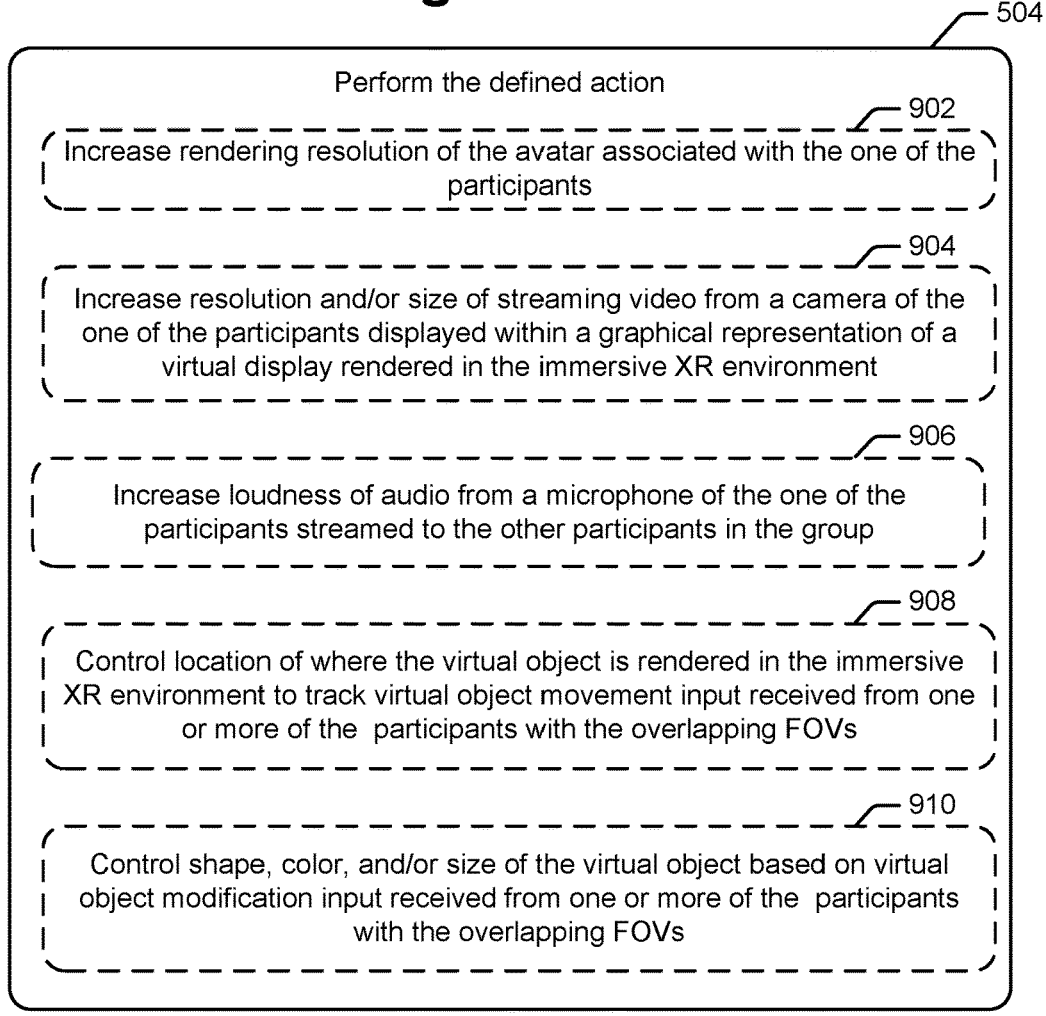

Related operations that can be performed by the XR environment server 100 to perform an action responsive to a virtual object action rule becoming satisfied during a virtual on-line meeting, are explained with regard to FIGS. 8A-B and 9.

Referring to FIGS. 7 and 8A, based on when the number of the participants overlapping FOVs which overlap avatar 700 satisfies the virtual object action rule, the operation to perform 504 the defined action directed to the avatar 700 that is associated with the one of the participants in the group, includes designating 802 the one of the participants in the group (participant associated with avatar 700) as a presenter for a group meeting and the action further performs at least one of the operations 804-808 shown in FIG. 8A. In one embodiment, following the operation to designate 802, a further operation initiates sharing 804 of content from the presenter with the other participants in the group meeting. In another embodiment, following the operation to designate 802, a further operation unmutes 806 the presenter's microphone to initiate streaming of audio from a microphone of the presenter to the other participants in the group meeting. In another embodiment, following the operation to designate 802, a further operation initiates display 808 of streaming video from a camera of the presenter within a graphical representation of a virtual display (virtual presentation screen 210 in FIGS. 2 and 7) rendered in the immersive XR environment for viewing by the other participants in the group meeting.

Referring to FIGS. 7 and 8B, based on when the number of the participants overlapping FOVs which overlap avatar 700 satisfies the virtual object action rule, the operation to perform 504 the defined action directed to the avatar 700 that is associated with the one of the participants in the group, includes designating 810 the one of the participants in the group (participant associated with avatar 700) as a presenter for a group meeting and the action further performs at least one of the operations 812 and 814 shown in FIG. 8B. In one embodiment, following the operation to designate 810, a further operation moves 812 the avatar associated with the presenter to a defined location in the immersive XR environment for viewing by the other participants in the group meeting. In another embodiment, following the operation to designate 810, a further operation changes 814 a size, color, and/or shape of the avatar associated with the presenter in the immersive XR environment to indicate the presenter's status for viewing by the other participants in the group meeting.

Thus, for example, when a sufficient number of participants in the virtual on-line meeting are looking at the avatar 700 in a manner that satisfies the virtual object action rule, the XR meeting server 100 can make the participant associated with avatar 700 a presenter which can enable (e.g., allow the presenter to initiate) and/or cause streaming of video and/or audio from a device of the presenter to other participants in the virtual on-line meeting, and/or cause the avatar 700 to be moved to a designated presenter location in the XR environment so that other participants can already have FOVs oriented to now view avatar 700 and/or view visual content provided by the presenter. Responsive to a sufficient number of participants viewing another avatar in a manner that satisfies a virtual object action rule, the XR meeting server 100 can similarly make a participant associated with the other avatar a presenter, thereby enabling and/or causing streaming of video and/or audio from a device of the presenter to other participants in the virtual on-line meeting, and may concurrently revoke presenter status for the participant associated with avatar 700 or may create a group of concurrent presenters including the new presenter and the earlier presenter associated with avatar 700. These operations can be advantageous in that they allow more natural human interaction with the XR environment by enabling participants to look toward the avatar of another participant who they desire or expect to next speak during a collaborative virtual on-line meeting.

Some other related operations that can be performed by the XR environment server 100 to perform an action responsive to a virtual object action rule becoming satisfied during a virtual on-line meeting, are explained with regard to FIG. 9. Referring to FIGS. 7 and 9, when the number of the participants with the FOVs that overlap satisfies the virtual object action rule, the operation to perform 504 the defined action directed to the virtual object that is associated with the one of the participants in the group, includes at least one of: increasing 902 rendered resolution of the avatar associated with the one of the participants; increasing 904 resolution and/or size of streaming video from a camera of the one of the participants displayed within a graphical representation of a virtual display rendered in the immersive XR environment for viewing by the other participants in the group; increasing 906 loudness of audio from a microphone of the one of the participants streamed to the other participants in the group; controlling 908 location of where the virtual object is rendered in the immersive XR environment to track virtual object movement input received from one or more of the participants with the FOVs that overlap the virtual object; and controlling 910 shape, color, and/or size of the virtual object based on virtual object modification input received from one or more of the participants with the FOVs that overlap the virtual object.

In some further embodiments, the operations further use a determination that a number of participants who are concurrently viewing a virtual object also have positioned their avatar bodies, e.g., rendered avatar hands, to concurrently contact the virtual object, which can be a further condition for satisfying a virtual object action rule associated with that virtual object.

Example XR Environment Server Configuration

Figure 12:
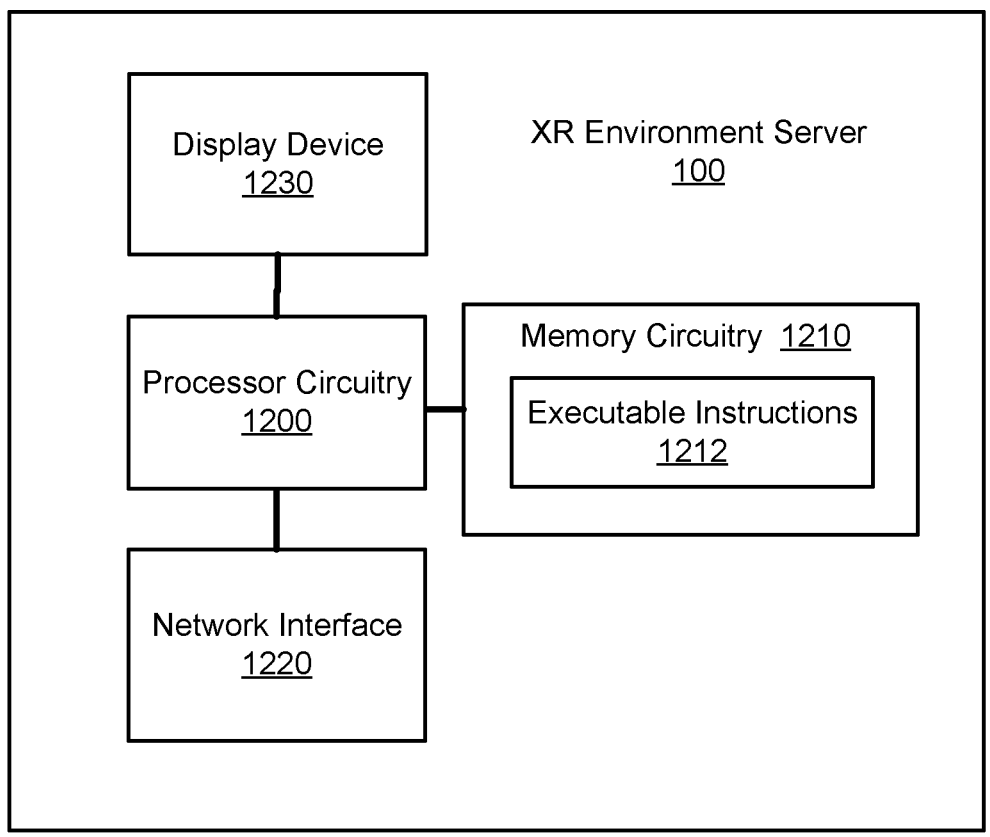
FIG. 12 is a block diagram of components of an XR environment server that are configured to operate in accordance with some embodiments of the present disclosure.

FIG. 12 is a block diagram of components of an XR environment server 100 that are configured to operate in accordance with some embodiments of the present disclosure. The XR environment server 100 can include at least one processor circuit 1200 (processor), at least one memory 1210 (memory), at least one network interface 1220 (network interface), and a display device 1230. The processor 1200 is operationally connected to these various components. The memory 1210 stores executable instructions 1212 that are executed by the processor 1200 to perform operations. The processor 1200 may include one or more data processing circuits, such as a general purpose and/or special purpose processor (e.g., microprocessor and/or digital signal processor), which may be collocated or distributed across one or more data networks. The processor 1200 is configured to execute the instructions 1212 in the memory 1210, described below as a computer readable medium, to perform some or all of the operations and methods for one or more of the embodiments disclosed herein for an XR environment server. As explained above, the XR environment server may be separate from and communicatively connect to the participant devices or may be at least partially integrated within one or more of the participant devices.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.,", which derives from the Latin phrase "exempli gratia," may be used to introduce or specify a general example or examples of a previously mentioned item, and is not intended to be limiting of such item. The common abbreviation "i.e.,", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the following examples of embodiments and their equivalents, and shall not be restricted or limited by the foregoing detailed description.

The invention claimed is:

1. An extended reality (XR) environment server comprising:
    at least one processor; and
    at least one memory storing instructions executable by the at least one processor to perform operations to:
        represent an immersive XR environment on a display device viewable by a participant among a group of participants who have associated avatars representing the participants and which are rendered for viewing in the immersive XR environment;
        determine direction of a field of view (FOV) of the participant from a perspective of a location of the associated avatar in the immersive XR environment relative to a coordinate system of the immersive XR environment;
        based on the direction of the FOV of the participant, identify a virtual object that is rendered for display at a location in the immersive XR environment which is within the FOV of the participant; and
        based on when a measurement of the FOV with respect to the virtual object satisfies a virtual object action rule, perform a defined action directed to the virtual object.

2. The XR environment server of claim 1, wherein an operation to determine when the measurement of the FOV with respect to the virtual object satisfies the virtual object action rule, comprises:
    determine a FOV hold time that the participant has maintained the FOV within a threshold angular range of the location of the virtual object; and
    determine that the virtual object action rule is satisfied based on the FOV hold time satisfying a hold time threshold number.

3. The XR environment server of claim 1, wherein an operation to determine when the measurement of the FOV with respect to the virtual object satisfies the virtual object action rule, comprises:
    measure a FOV hold stability value indicating an amount of angular movement occurring between a center of the FOV of the participant from the location of the virtual object during a defined duration; and
    determine that the virtual object action rule is satisfied based on the FOV hold stability value satisfying a FOV hold stability threshold number.

4. The XR environment server of claim 1, wherein an operation to determine when the measurement of the FOV with respect to the virtual object satisfies the virtual object action rule, comprises:
  determining whether a virtual object access rule is satisfied based on at least one of:
    determining whether the participant has a defined privilege that satisfies the virtual object access rule for being allowed to perform an action directed to the virtual object; or
    determining whether the participant has a defined role in the immersive XR environment that satisfies the virtual object access rule for being allowed to perform an action directed to the virtual object.

5. The XR environment server of claim 1, wherein the instructions executable by the at least one processor further perform operations to:
  determine directions of FOVs of the participants from perspectives of locations of the associated avatars in the immersive XR environment relative to the coordinate system of the immersive XR environment;
  based on the directions of the FOVs of the participants, identify that the virtual object which is rendered for display at the location in the immersive XR environment is within an overlap of the FOVs of a number of the participants; and
  based on when the number of the participants with the FOVs which overlap the virtual object satisfies the virtual object action rule, perform the defined action directed to the virtual object.

6. The XR environment server of claim 5, wherein an operation to determine when the number of the participants with the FOVs that overlap satisfies the virtual object action rule, comprises:
  for each of the number of the participants with the FOVs that overlap, determine a FOV hold time that the participant has maintained the FOV within a threshold angular range of the location of the virtual object; and
  determine that the virtual object action rule is satisfied based on the number of the participants with the FOVs that overlap satisfying a group size threshold number and based on the FOV hold time satisfying a hold time threshold number for the participants with the FOVs that overlap.

7. The XR environment server of claim 5, wherein an operation to determine when the number of the participants with the FOVs that overlap satisfies the virtual object action rule, comprises:
  for each of the number of the participants with the FOVs that overlap, measure a FOV hold stability value indicating an amount of angular movement occurring between a center of the FOV of the participant from the location of the virtual object during a defined duration; and
  determine that the virtual object action rule is satisfied based on the number of the participants with the FOVs that overlap satisfying a group size threshold number and based on the FOV hold stability value satisfying a FOV hold stability threshold number for the participants with the FOVs that overlap.

8. The XR environment server of claim 5, wherein an operation to determine when the number of the participants with the FOVs that overlap satisfies the virtual object action rule, comprises at least one of:
  set a threshold number defined by the virtual object action rule based on a total number of participants who are present in the immersive XR environment, wherein the operation to determine when the number of the participants with the FOVs that overlap satisfies the virtual object action rule comprising comparing the threshold number to the number of the participants with the FOVs that overlap; or
  set the threshold number defined by the virtual object action rule based on an indication of how quickly the avatars associated with the group of participants are moving within the immersive XR environment.

9. The XR environment server of claim 5, based on when the number of the participants with the FOVs that overlap satisfies the virtual object action rule, the operation to perform the defined action directed to the virtual object comprises at least one of:
  trigger playout of an audio stream, which is programmatically linked to the virtual object, to the participants with the FOVs that overlap;
  trigger playout of a video stream, which is programmatically linked to the virtual object, to the participants with the FOVs that overlap; or
  trigger generation of haptic feedback and/or other notification, which is programmatically linked to the virtual object, to the participants with the FOVs that overlap.

10. The XR environment server of claim 5, wherein:
  the virtual object corresponds to one of the avatars associated with one of the participants in the group, and
  based on when the number of the participants with the FOVs that overlap satisfies the virtual object action rule, the operation to perform the defined action directed to the virtual object that is associated with the one of the participants in the group, comprises at least one of:
    designating the one of the participants in the group as a presenter for a group meeting and initiating sharing of content from the presenter with the other participants in the group meeting;
    designating the one of the participants in the group as the presenter for the group meeting and unmuting the presenter's microphone to initiate streaming of audio from a microphone of the presenter to the other participants in the group meeting; or
    designating the one of the participants in the group as the presenter for the group meeting and initiating display of streaming video from a camera of the presenter within a graphical representation of a virtual display rendered in the immersive XR environment for viewing by the other participants in the group meeting.

11. The XR environment server of claim 5, wherein:
  the virtual object corresponds to one of the avatars associated with one of the participants in the group, and
  based on when the number of the participants with the FOVs that overlap satisfies the virtual object action rule, the operation to perform the defined action directed to the virtual object that is associated with the one of the participants in the group, comprises at least one of:
    designating the one of the participants in the group as a presenter for the group meeting and moving the avatar associated with the presenter to a defined location in the immersive XR environment for viewing by the other participants in the group meeting; or
    designating the one of the participants in the group as the presenter for the group meeting and changing a size, color, and/or shape of the avatar associated with the presenter in the immersive XR environment to indicate the presenter's status for viewing by the other participants in the group meeting.

12. The XR environment server of claim 5, wherein:
the virtual object corresponds to one of the avatars associated with one of the participants in the group, and based on when the number of the participants with the FOVs that overlap satisfies the virtual object action rule, the operation to perform the defined action directed to the virtual object comprises at least one of:
increasing rendered resolution of the avatar associated with the one of the participants;
increasing resolution and/or size of streaming video from a camera of the one of the participants displayed within a graphical representation of a virtual display rendered in the immersive XR environment for viewing by the other participants in the group; or
increasing loudness of audio from a microphone of the one of the participants streamed to the other participants in the group.

13. The XR environment server of claim 5, wherein:
based on when the number of the participants with the FOVs that overlap satisfies the virtual object action rule, the operation to perform the defined action directed to the virtual object comprises at least one of:
controlling location of where the virtual object is rendered in the immersive XR environment to track virtual object movement input received from one or more of the participants with the FOVs that overlap the virtual object; or
controlling shape, color, and/or size of the virtual object based on virtual object modification input received from one or more of the participants with the FOVs that overlap the virtual object.

14. The XR environment server of claim 5, based on when the number of the participants with the FOVs that overlap does not satisfy the virtual object action rule, performing at least one of:
displaying an indication that the virtual object action rule for the virtual object is not satisfied, for view by the participants with the FOVs that overlap;
displaying an indication of how many other participants need to join the participants with overlapping FOVs of the virtual object in order for the virtual object action rule to become satisfied; or
displaying an indication of a particular person's name who needs to join the participants with overlapping FOVs of the virtual object in order for the virtual object action rule to become satisfied.

15. The XR environment server of claim 1, based on when the measurement of the FOV with respect to the virtual object satisfies the virtual object action rule, the operation to perform the defined action directed to the virtual object comprises at least one of:
provide access for the participant to view textual content programmatically linked to the virtual object;
provide access for the participant to view video playout of video content programmatically linked to the virtual object;
provide access for the participant to listen to audio playout of audio content programmatically linked to the virtual object;
provide access for the participant to edit a characteristic of the virtual object;
provide access for the participant to programmatically link a picture, video, audio, and/or text to the virtual object; or programmatically link a digital signature of the participant to the virtual object.

16. The XR environment server of claim 1, based on when the measurement of the FOV with respect to the virtual object satisfies the virtual object action rule, the operation to perform the defined action directed to the virtual object comprises at least one of:
control supply of power to a wall plug socket communicatively connected to the XR environment server;
control supply of power to a light fixture communicatively connected to the XR environment server;
control turning on and/or turning off a television communicatively connected to the XR environment server;
control tuning of channels by a television communicatively connected to the XR environment server;
control locking and unlocking of an entrance door lock communicatively connected to the XR environment server;
launch execution of an application by a computer device communicatively connected to the XR environment server; or
provide input to an application being executed by a computing device communicatively connected to the XR environment server.

17. A method by an extended reality (XR) environment server comprising:
representing an immersive XR environment on a display device viewable by a participant among a group of participants who have associated avatars representing the participants and which are rendered for viewing in the immersive XR environment;
determining direction of a field of view (FOV) of the participant from a perspective of a location of the associated avatar in the immersive XR environment relative to a coordinate system of the immersive XR environment;
based on the direction of the FOV of the participant, identifying a virtual object that is rendered for display at a location in the immersive XR environment which is within the FOV of the participant; and
based on when a measurement of the FOV with respect to the virtual object satisfies a virtual object action rule, performing a defined action directed to the virtual object.

18. The method of claim 17, further comprising:
determining directions of FOVs of the participants from perspectives of locations of the associated avatars in the immersive XR environment relative to the coordinate system of the immersive XR environment;
based on the directions of the FOVs of the participants, identifying that the virtual object which is rendered for display at the location in the immersive XR environment is within an overlap of the FOVs of a number of the participants; and
based on when the number of the participants with the FOVs which overlap the virtual object satisfies the virtual object action rule, performing the defined action directed to the virtual object.

19. The method of claim 18, based on when the number of the participants with the FOVs that overlap satisfies the virtual object action rule, the method to perform the defined action directed to the virtual object comprises at least one of:
triggering playout of an audio stream, which is programmatically linked to the virtual object, to the participants with the FOVs that overlap;

triggering playout of a video stream, which is programmatically linked to the virtual object, to the participants with the FOVs that overlap; or triggering generation of haptic feedback, which is programmatically linked to the virtual object, to the participants with the FOVs that overlap.

20. The method of claim 18, wherein:

the virtual object corresponds to one of the avatars associated with one of the participants in the group, and based on when the number of the participants with the FOVs that overlap satisfies the virtual object action rule, the method to perform the defined action directed to the virtual object that is associated with the one of the participants in the group, comprises at least one of:

designating the one of the participants in the group as a presenter for a group meeting and initiating sharing of content from the presenter with the other participants in the group meeting;

designating the one of the participants in the group as the presenter for the group meeting and unmuting the presenter's microphone to initiate streaming of audio from a microphone of the presenter to the other participants in the group meeting; or designating the one of the participants in the group as the presenter for the group meeting and initiating display of streaming video from a camera of the presenter within a graphical representation of a virtual display rendered in the immersive XR environment for viewing by the other participants in the group meeting.

21. The method of claim 17, based on when the measurement of the FOV with respect to the virtual object satisfies the virtual object action rule, the method to perform the defined action directed to the virtual object comprises at least one of:

providing access for the participant to view textual content programmatically linked to the virtual object;

providing access for the participant to view video playout of video content programmatically linked to the virtual object;

providing access for the participant to listen to audio playout of audio content programmatically linked to the virtual object;

providing access for the participant to edit a characteristic of the virtual object;

providing access for the participant to programmatically link a picture, video, audio, and/or text to the virtual object; or programmatically linking a digital signature of the participant to the virtual object.

22. The method of claim 17, based on when the measurement of the FOV with respect to the virtual object satisfies the virtual object action rule, the method to perform the defined action directed to the virtual object comprises at least one of:

controlling supply of power to a wall plug socket communicatively connected to the XR environment server;

controlling supply of power to a light fixture communicatively connected to the XR environment server;

controlling turning on and/or turning off a television communicatively connected to the XR environment server;

controlling tuning of channels by a television communicatively connected to the XR environment server;

controlling locking and unlocking of an entrance door lock communicatively connected to the XR environment server;

launching execution of an application by a computer device communicatively connected to the XR environment server; or providing input to an application being executed by a computing device communicatively connected to the XR environment server.

* * * * *